United States Patent [19]

Yoshii et al.

[11] 4,435,522

[45] Mar. 6, 1984

[54] METHOD OF PRODUCING A CATALYST FOR LIQUEFACTION OF COAL

[76] Inventors: Tsuneo Yoshii, 284-banchi, Jonboji-cho, Kashihara-shi, Nara; Toshitaka Ueda, 5-23, Yagi-cho 3-chome, Kashihara-shi, Nara; Tsukasa Kuroda, 3-2, Yuzato 1-chome, Higashisumiyoshi-ku, Osaka, all of Japan

[21] Appl. No.: 400,422

[22] Filed: Jul. 21, 1982

[30] Foreign Application Priority Data

Aug. 3, 1981 [JP] Japan ............................. 56-122211

[51] Int. Cl.$^3$ .............................................. B01J 23/26
[52] U.S. Cl. ........................................ 502/319; 208/10
[58] Field of Search ........................... 252/467; 208/10

[56] References Cited

U.S. PATENT DOCUMENTS 3,687,838  8/1972  Seitzer ................................... 208/10
4,172,814 10/1979  Moll et al. ...................... 252/467 X

FOREIGN PATENT DOCUMENTS 422892  1/1935  United Kingdom ................. 208/10

Primary Examiner—W. J. Shine
Attorney, Agent, or Firm—Armstrong, Nikadio, Marmelstein & Kubovcik

[57] ABSTRACT

A method of producing a catalyst for liquefaction of coal comprises heat-treating a salt or oxide of molybdenum or an alloy steel containing at least 0.3 weight percent of molybdenum in the presence of an alkali and water in a carbon monoxide atmosphere at a temperature of 220° to 450° C., and after water rinse and drying, reducing the same in the presence of tetralin and/or a phenol compound in a hydrogen atmosphere at a temperature of 400° to 450° C.

1 Claim, No Drawings

METHOD OF PRODUCING A CATALYST FOR LIQUEFACTION OF COAL

FIELD OF THE INVENTION

This invention relates to a method of producing a coal liquefaction catalyst from molybdenum or an alloy steel containing at least 0.3 weight percent of molybdenum.

DESCRIPTION OF THE PRIOR ART

There are known several catalysts for liquefaction of coal such as molybdenum-cobalt-system, nickel-molybdenum-system, metal halide and red mud-sulfur type catalysts. Among them, hydrodesulphurization catalysts such as molybdenum-cobalt- or nickel-molybdenum-systems and metal halides have been extensively used and evaluated as most effective catalysts for coal liquefaction. The former, however, is deactivated and poisoned by sulphur-, nitrogen- or oxygen-containing compounds as well as some mineral constituents of coal, and the use of the latter is impractical on a large scale because of corrosion of the available equipment and of difficulty in the separation of the products and in the regeneration. Therefore, a great effort of research is now being concentrated on the development of a new improved catalyst, which would have appropriate activity and long life-time and could be easily regenerated when deactivated.

OBJECTS AND SUMMARY OF THE INVENTION

This invention has been accomplished in view of the above situation and has as its object to provide a catalyst which is free from the disadvantage of rapid inactivation and easy to regenerate and which is particularly suitable for the liquefaction of coal.

The method of this invention is characterized by heat-treating a salt or oxide of molybdenum or an alloy steel containing at least 0.3 weight percent of molybdenum in the presence of an alkali and water in a carbon monoxide atmosphere at a temperature of 220° to 450° C., and after water rinse and drying, reducing the same in the presence of tetralin and/or a phenol compound in a hydrogen atmosphere at a temperature of 400° to 450° C.

DETAILED DESCRIPTION OF THE INVENTION

The alloy steel that can be employed in the practice of this invention is an alloy steel containing at least 0.3 weight percent of molybdenum such as SCM-3, SKH-9 SUS-316 standardized by Japanese Industrial Standard. Their analysis are given in Table 1.

TABLE 1

| Type of alloy | Chemical composition (wt %) | | | |
|---|---|---|---|---|
| | C | Si | Mn | P |
| SCM-3 | 0.33~0.38 | 0.15~0.35 | 0.60~0.85 | 0.034 |
| SKH-9 | 0.80~0.90 | 0.40 | 0.40 | 0.030 |
| SUS-316 | <0.08 | <1.00 | <2.00 | <0.045 |
| Type of alloy | Chemical composition (wt %) | | | |
| | S | Ni | | Cr |
| SCM-3 | 0.030 | <0.25 | | 0.30~1.20 |
| SKH-9 | 0.030 | <0.25 | | 3.80~4.50 |
| SUS-316 | <0.030 | 10.00~14.00 | | 16.00~18.00 |
| Type of alloy | Chemical composition (wt %) | | | |
| | Mo | Cu | W | V |
| SCM-3 | 0.15~0.30 | <0.25 | — | — |
| SKH-9 | 4.50~5.50 | <0.25 | 5.50~6.70 | 1.60~2.20 |
| SUS-316 | 2.0~3.00 | — | — | — |

The greater the molybdenum content, the more satisfactory is the result. As to the salts of molybdenum, any of the ammonium salt, nitrate, chloride, carbonate, organic acid salts can be employed. As to the oxide of molybdenum, any oxide can be employed. The alkali may be one of the general formula MOH, where M is generally an alkali metal or an ammonium group, although the calcium, barium, sodium carbonate, ammonium carbonate, sodium phosphate etc. may also be employed. The phenol compound may be a monohydric phenol or a polyhydric phenol. The heat-treating is conducted in the presence of an effective amount of alkali and water in a carbon monoxide atmosphere at a temperature of 220° to 450° C. The reduction is conducted in the presence of an effective amount of tetralin and/or a phenol compound in a hydrogen atmosphere at a temperature of 400° to 450° C. The reduction in a hydrogen atmosphere is preferably conducted at an initial hydrogen pressure is below 50 kg/cm². If the pressure is below 50 kg/cm², the reaction rate is too low.

The catalyst obtained by the present invention can be conversion of heavy petroleum oil to oils in rich in lighter fractions.

The following examples serve to illustrate the present invention but should not be construed as imposing any limitations on the present invention.

EXAMPLE 1

To 10 g of ammonium molybdate were added 10 g of sodium hydroxide and 5 ml of water, and the mixture was heated at about 50° C. until the ammoniacal odor had disappeared. The mixture was then heat-treated in a carbon monoxide atmosphere (100 kg/cm²) at 420° C. for an hour. The reaction product was thoroughly washed with warm water and heated to dryness at 100±5° C. To 8 g of the dried product were added 2 g of catechol and 50 ml of tetralin, and the reduction reaction was conducted in hydrogen gas atmosphere (100 kg/cm²) at 420° C. The reaction mixture was filtered and dried at 130° C. for 24 hours to give a catalyst (yield 7.5 g).

To 10 g of coal was added 1 g of the above catalyst, followed by addition of 15 g of diphenyl ether. The hydrogenolysis reaction was conducted in a hydrogen atmosphere (initial pressure 30 kg/cm²) at 400°~430° C. and the hydrogenolysis product was allowed to stand at room temperature and then the product was extracted with n-hexane. The amount of n-hexane extract was calculated from the amount of the extraction residue to use as an index of liquefaction.

The overall conversion of coal to liquid and gaseous products was calculated from the following formula:

Conversion (% *d.a.f. coal) =

$$\frac{\text{dry coal(g)} - \text{dry unreacted coal(g)}}{\text{d.a.f. coal(g)}} \times 100$$

(*d.a.f.:dry ash free)

The results are shown in Table 2. For control purposes, the amounts of n-hexane extract without a catalyst were also measured and are shown in the same table.

TABLE 2

| Description of coal | Temperature of hydrogenolysis | Catalyst | n-Hexane extracted (wt %) |
|---|---|---|---|
| Lithgow coal | 400° C. | not used | 17.6 |
| | | used | 30.4 |
| | 430° C. | not used | 23.1 |
| | | used | 48.1 |
| Yallourn coal | 400° C. | not used | 29.2 |
| | | used | 69.6 |
| | 430° C. | not used | 30.0 |
| | | used | 72.9 |
| Taiheiyo coal | 400° C. | not used | 27.8 |
| | | used | 58.3 |
| | 430° C. | not used | 39.9 |
| | | used | 62.7 |

EXAMPLE 2

A stirrer-rod with five stirrer-blades (each blade is made of SCM-3, 30 mm long by 10 mm wide by 1.3 mm thick) was heat-treated in the presence of 5 g of sodium hydroxide and 5 ml of water in a carbon monoxide atmosphere (80 kg/cm$^2$) at 420° C. for an hour. After the treatment, the stirrer-rod was thoroughly washed with warm water and heated to dryness at 100±5° C. After dryness, the reduction reaction was conducted in the presence of 2 g of catechol and 50 ml of tetralin in hydrogen gas atmosphere (50 kg/cm$^2$) at 400° C. The stirrer-rod was dried at 130° C. for 24 hours to give a catalyst on the surface of the each stirrer-blade.

The above-described stirrer-rod was equipped in an autoclave, and 5 g of coal and 30 ml of tetralin were charged in a vessel in the same autoclave. Then the hydrogenolysis reaction was conducted in a hydrogen atmosphere (initial pressure 50 kg/cm$^2$) at 400° and 420° C. and the hydrogenolysis product was allowed to stand at room temperature and then the product was extracted with n-hexane. The amount of n-hexane extract was calculated from the amount of the extraction residue to use as an index of liquefaction.

The overall conversion of coal to liquid and gaseous products was calculated from the aforementioned formula.

The results are shown in Table 3. For control purposes, the amounts of n-hexane extract without a catalyst were also measured and are shown in the same table.

TABLE 3

| Description of coal | Temperature of hydrogenolysis | Catalyst | n-Hexane extracted (wt %) |
|---|---|---|---|
| Lithgow coal | 400° C. | not used | 16.8 |
| | | used | 32.4 |
| | 420° C. | not used | 21.1 |
| | | used | 50.1 |
| Yallourn coal | 400° C. | not used | 28.2 |
| | | used | 68.6 |
| | 420° C. | not used | 29.8 |
| | | used | 73.9 |
| Taiheiyo coal | 400° C. | not used | 26.0 |
| | | used | 51.8 |
| | 420° C. | not used | 56.8 |
| | | used | 71.8 |

EXAMPLE 3

The procedure of Example 2 was repeated, using a molybdenum-containing alloy SUS-316 in place of an alloy SCM-3.

The liquefaction of coal was conducted in the same manner as Example 2.

The results are shown in Table 4. For control purposes, the amounts of n-hexane extract without a catalyst were also measured and are shown in the same table.

TABLE 4

| Description of coal | Temperature of hydrogenolysis | Catalyst | n-Hexane extracted (wt %) |
|---|---|---|---|
| Lithgow coal | 400° C. | not used | 16.5 |
| | | used | 33.8 |
| | 420° C. | not used | 22.3 |
| | | used | 51.2 |
| Yallourn coal | 400° C. | not used | 27.8 |
| | | used | 69.1 |
| | 420° C. | not used | 30.1 |
| | | used | 73.3 |
| Taiheiyo coal | 400° C. | not used | 27.3 |
| | | used | 52.9 |
| | 420° C. | not used | 57.2 |
| | | used | 72.0 |

EXAMPLE 4

The procedure of Example 2 was repeated, using a molybdenum-containing alloy SKH-9 in place of an alloy SCM-3.

The liquefaction of coal was conducted in the same manner as Example 2.

The results are shown in Table 5. For control purposes, the amounts of n-hexane extract without a catalyst were also measured and are shown in the same table.

TABLE 5

| Description of coal | Temperature of hydrogenolysis | Catalyst | n-Hexane extracted (wt %) |
|---|---|---|---|
| Lithgow coal | 400° C. | not used | 17.3 |
| | | used | 32.7 |
| | 420° C. | not used | 23.0 |
| | | used | 49.9 |
| Yallourn coal | 400° C. | not used | 28.1 |
| | | used | 69.5 |
| | 420° C. | not used | 30.4 |
| | | used | 73.6 |
| Taiheiyo coal | 400° C. | not used | 27.0 |
| | | used | 52.3 |
| | 420° C. | not used | 56.2 |
| | | used | 72.9 |

It is understood that when coal is liquefied with the catalyst obtained by the method of this invention, a very high degree of conversion can be accomplished. There also is the advantage of a low reaction pressure.

The catalysts obtained in Example 2 to 4 are such that even if they were degraded, they can be easily regenerated by a re-treatment. In addition, the said catalysts have long lifetime and can be used consecutively.

What is claimed:

1. A method of producing a catalyst for liquefaction of coal comprising heat-treating a salt or oxide of molybdenum or an alloy steel containing at least 0.3 weight percent of molybdenum in the presence of an alkali and water in a carbon monoxide atmosphere at a temperature of 220° to 450° C., and after water rinse and drying, reducing the same in the presence of tetralin and/or a phenol compound in a hydrogen atmosphere at a temperature of 400° to 450° C.

* * * * *